US011013059B2

(12) United States Patent
Nakarmi et al.

(10) Patent No.: US 11,013,059 B2
(45) Date of Patent: May 18, 2021

(54) HANDLING RRC CONNECTION RELEASE

(71) Applicant: TELEFONAKTIEBOLAGET LM ERICSSON (PUBL), Stockholm (SE)

(72) Inventors: Prajwol Kumar Nakarmi, Sollentuna (SE); Magnus Stattin, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 42 days.

(21) Appl. No.: 16/604,488

(22) PCT Filed: Apr. 6, 2018

(86) PCT No.: PCT/IB2018/052415
§ 371 (c)(1),
(2) Date: Oct. 10, 2019

(87) PCT Pub. No.: WO2018/189636
PCT Pub. Date: Oct. 18, 2018

(65) Prior Publication Data
US 2020/0163151 A1 May 21, 2020

Related U.S. Application Data

(60) Provisional application No. 62/483,775, filed on Apr. 10, 2017.

(51) Int. Cl.
*H04W 76/30* (2018.01)
*H04W 76/25* (2018.01)
*H04W 76/27* (2018.01)
*H04W 12/086* (2021.01)

(Continued)

(52) U.S. Cl.
CPC ....... *H04W 76/30* (2018.02); *H04W 12/0431* (2021.01); *H04W 12/0471* (2021.01); *H04W 12/086* (2021.01); *H04W 76/25* (2018.02); *H04W 76/27* (2018.02)

(58) Field of Classification Search
CPC ............... H04W 76/30; H04W 12/086; H04W 12/0431; H04W 12/0471; H04W 76/25; H04W 76/27; H04W 4/70; H04W 72/04; H04W 72/12; H04W 76/00; H04L 63/20;
(Continued)

(56) References Cited

U.S. PATENT DOCUMENTS

2019/0254102 A1* 8/2019 Teyeb ................... H04W 76/19

OTHER PUBLICATIONS

Rajavelsamy, R., et al. "A method of efficient data transmission over Evolved Packet System." 2014 IEEE International Conference on Communications (ICC). IEEE, 2014. (Year: 2014).*
(Continued)

*Primary Examiner* — Sharad Rampuria

(57) ABSTRACT

According to certain embodiments, a method for use in a wireless device comprises receiving a release message from a network node operating in a network. The release message comprises a first release token and an instruction to release a radio resource control (RRC) connection. The method comprises determining whether the first release token passes verification and determining an action to perform based on whether the first release token passes verification. In response to a determination that the first release token passes verification, the action comprises releasing the RRC connection.

18 Claims, 8 Drawing Sheets

(51) Int. Cl.
*H04W 12/0431* (2021.01)
*H04W 12/0471* (2021.01)

(58) Field of Classification Search
CPC .................. H04B 7/2121; H04B 7/2123; H04J 2203/0069; H04Q 2213/394
See application file for complete search history.

(56) References Cited

OTHER PUBLICATIONS

Nokia, Analysis on LS R2-169124 on LTE redirection attack, S3-170353, 3GPP TSG SA WG3 (Security) Meeting #186, Feb. 6-10, 2017, Sophia Antipolis, France.
Ericsson, A solution for RLF in CP NB-IoT, SE-170254, 3GPP TSG-SA WG3 Meeting #86, Sophia Antipolis, France, Feb. 6-10, 2017.
Ericsson, RRC re-establishment for CP NB-IoT, S3-170256, 3GPP TSG-SA3 Meeting #86, Sophia Antipolis, France, Feb. 6-10, 2017.
Sequans Communications, RRC Connection Release for CP solution, R2-162828, 3GPP TSG-RAN WG2 #93bis, Dubrovnik, Croatia, Apr. 11-15, 2016.
Nokia, Security solution to support CIoT Optimization for large file transfer, S3-170111, 3GPP TSG SA WG3 (Security) Meeting #86, Sophia Antipolis, France, Feb. 6-10, 2017.

* cited by examiner

HANDLING RRC CONNECTION RELEASE

RELATED APPLICATIONS

This application is a 371 of International Application No. PCT/IB2018/052415, filed Apr. 6, 2018, which claims the benefit of U.S. Application No. 62/483,775, filed Apr. 10, 2017, the disclosures of which are fully incorporated herein by reference.

BACKGROUND

The Third Generation Partnership Project (3GPP) provides technical specifications (TS) related to wireless networks, such as Long Term Evolution (LTE) networks and 5th Generation (5G) networks (also referred to as New Radio, NR, networks). In TS 23.401 clause 5.3.4B and other technical specifications (such as TS 24.301), 3GPP specifies Control Plane Cellular Internet-of-Things (CP CIoT) optimizations for transporting data over non access stratum (NAS). This may also be referred to as Data Over NAS or DoNAS. The security features are specified in TS 33.401 clause 8.2 (which is very short since the security impact of the basic solution is very limited). The purpose of the DoNAS feature is sending data over NAS signaling without establishing data radio bearers (DRBs) and without establishing Access Stratum (AS) security. The intention is to save signaling. FIG. 1 illustrates the DoNAS principle specified in TS 23.401 (FIG. 5.3.4B.2-1). As illustrated in FIG. 1, the UE may be considered to be in connected mode when it has a radio resource control (RRC) connection with a base station, such as an enhanced node B (eNB).

The 3GPP radio access network (RAN) working group provides work item R3-161324 to look at mobility enhancements for CP-CIoT. Handovers are not supported for CP CIoT, but the user equipment (UE) may still move, which can cause a radio link failure (RLF) when the UE is in connected mode. This has raised the issue of what to do in such case. Since access stratum (AS) security is not supported for the CP CIoT feature, the existing mechanisms for RLF cannot be used securely "as is." In other words, it is not acceptable "security-wise" to use the existing RLF handling mechanism in CP CIoT.

When it is determined that an (active) RRC connection is not needed, the network can release the RRC connection. FIG. 2 illustrates an example of RRC connection release according to 3GPP TS 36.331 (FIG. 5.3.8.1-1). In LTE and in Narrow Band Internet-of-Things (NB-IoT), the RRC connection can be released with secure signaling for UEs supporting User Plane data transfer and AS security. For example, the RRConnectionRelease message can be sent on SRB1 with AS integrity protection. For UEs supporting only control plane (CP) data transfer over NAS (DoNAS), AS security is not supported and the RRCConnectionRelease message cannot be sent securely; it is sent on SRB1bis or SRB0 which are unprotected/lack AS integrity protection.

There are known (but not yet deployed) techniques for preventing spoofed RRC Connection Re-establishment message. For example, the following 3GPP contributions describe various mechanisms aiming at doing so: S3-170111, S3-170254, S3-170352, S3-170077, S3-170332, and S3-170302.

SUMMARY

Certain problems can be envisioned with respect to prior solutions for handling RRC connections. As discussed above, there are known techniques for preventing spoofed RRC Connection Re-establishment messages for DoNAS. However, even when the spoofed RRC Connection Re-establishment attack is mitigated for DoNAS (e.g., using AS based token or NAS based token), it is still possible for an attacker to mount Denial of Service (DoS) on UEs by sending a spoofed RRC Connection Release message. In DoNAS, there is no known way of protecting the RRC Connection Release message because AS security does not exist. Certain embodiments of the present disclosure provide solutions to these and other problems. For example, it is proposed herein to use the AS based token to act as integrity protection for RRC Connection Release message.

According to certain embodiments, a method is disclosed for use in a wireless device. The method comprises receiving a release message from a network node operating in a network. The release message comprises a first release token and an instruction to release an RRC connection. The method comprises determining whether the first release token passes verification and determining an action to perform based on whether the first release token passes verification. In response to a determination that the first release token passes verification, the action comprises releasing the RRC connection.

According to certain embodiments, a wireless device is disclosed. The wireless device comprises processing circuitry and logic that, when executed by the processing circuitry, causes the wireless device to receive a release message from a network node operating in a network. The release message comprises a first release token and an instruction to release an RRC connection. The logic, when executed by the processing circuitry, also causes the wireless device to determine whether the first release token passes verification and determine an action to perform based on whether the first release token passes verification. In response to a determination that the first release token passes verification, the action comprises releasing the RRC connection.

According to certain embodiments, a computer program is disclosed. The computer program comprises logic which when executed on a computer causes the computer to perform the above-described method for use in a wireless device. In particular, the computer program causes the computer to perform receiving a release message from a network node operating in a network. The release message comprises a first release token and an instruction to release an RRC connection. The computer program performs determining whether the first release token passes verification and determining an action to perform based on whether the first release token passes verification. In response to a determination that the first release token passes verification, the action comprises releasing the RRC connection.

The above-described wireless device, method for use in a wireless device, and/or computer program may each include one or more additional features, examples of which are as follows:

In some embodiments, the RRC connection comprises a connection for which AS security has not been established. In some embodiments, the RRC connection comprises a connection for which DRBs have not been established. In some embodiments, the RRC connection supports CP-CIoT or DoNAS functionality.

In some embodiments, the release message is received via an SRB that lacks AS security. The first release token can be received via AS signalling or via NAS signaling.

In some embodiments, in response to a determination that the first release token fails verification, the action comprises starting a procedure to re-establish the RRC connection. In some embodiments, in response to a determination that the first release token fails verification, the action comprises ignoring the instruction to release the RRC connection.

In some embodiments, determining whether the first release token passes verification comprises determining that the first release token passes verification if the first release token received in the release message matches a second release token obtained by the wireless device. As an example, in some embodiments, the second release token is based at least in part on a key shared between the wireless device and the network. As another example, in some embodiments, the second release token is computed based at least in part on an algorithm agreed between the wireless device and the network. Thus, prior to receiving the release message, certain embodiments receive an indication from the network indicating that a key, an algorithm, or both are in place for computing the second release token. The indication can be received from a radio access network node or a core network node. The indication can be an implicit indication or an explicit indication. According to certain embodiments, a method is disclosed for use in a network node operating in a network. The method comprises obtaining a first release token and sending a release message to a wireless device. The release message comprises the first release token and an instruction to release an RRC connection.

According to certain embodiments, a network node is disclosed. The network node comprises processing circuitry and logic that, when executed by the processing circuitry, causes the network node to obtain a first release token and send a release message to a wireless device. The release message comprises the first release token and an instruction to release an RRC connection.

According to certain embodiments, a computer program is disclosed. The computer program comprise logic which when executed on a computer causes the computer to perform the above-described method for use in a network node. In particular, the computer program causes the computer to perform obtaining a first release token and sending a release message to a wireless device. The release message comprises the first release token and an instruction to release an RRC connection.

The above-described network node, method for use in a network node, and/or computer program may each include one or more additional features, examples of which are as follows:

In some embodiments, the RRC connection comprises a connection for which AS security has not been established. In some embodiments, the RRC connection comprises a connection for which DRBs have not been established. In some embodiments, the RRC connection supports CP-CIoT or DoNAS functionality.

In some embodiments, the release message is sent via an SRB that lacks access stratum security. In some embodiments, the network node comprises a base station and the first release token is sent via AS signaling. In some embodiments, the network node comprises a core network node, such as a mobility management entity (MME) in LTE or an access and mobility management function (AMF) in 5G, and the first release token is sent via NAS signaling.

In some embodiments, the first release token is obtained from another network node. For example, the method can be implemented in a base station that obtains the first release token from a core network node, such as an MME in LTE or an AMF in 5G. In some embodiments, the first release token is obtained by computing the first release token. For example, the first release token is computed based at least in part on information received from another network node, based at least in part on a key shared between the wireless device and the network, and/or based at least in part on an algorithm agreed between the wireless device and the network.

In some embodiments, prior to sending the release message, the network node sends the wireless device an indication indicating that a key, an algorithm, or both are in place for computing the second release token. The indication can be explicit or implicit.

In some embodiments, the network node comprises a radio access network node, such as an eNB in LTE or a gNB in 5G. In other embodiments, the network node comprises a core network node, such as an MME in LTE or an AMF in 5G.

In some embodiments, the release message is sent in response to detecting a radio link failure associated with the RRC connection.

In some embodiments, the network node/method/computer program determines whether to include the first release token in the release message based on whether the release message is being sent via an SRB that lacks access stratum security.

The embodiments disclosed herein may provide one or more technical advantages. As an example, in certain embodiments, a UE can detect and take action against a spoofed RRC Connection Release message. As another example, certain embodiments prevent a spoofed RRC Connection Release message from causing data loss for a prolonged DoNAS session. As another example, certain embodiments allow for shrinking or eliminating an attack window during which a UE might obey a spoofed RRC Connection Release. Certain embodiments may have all, some, or none of these advantages. Other advantages may be understood by those of ordinary skill in the art.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION

DETAILED DESCRIPTION

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

Figure 1:
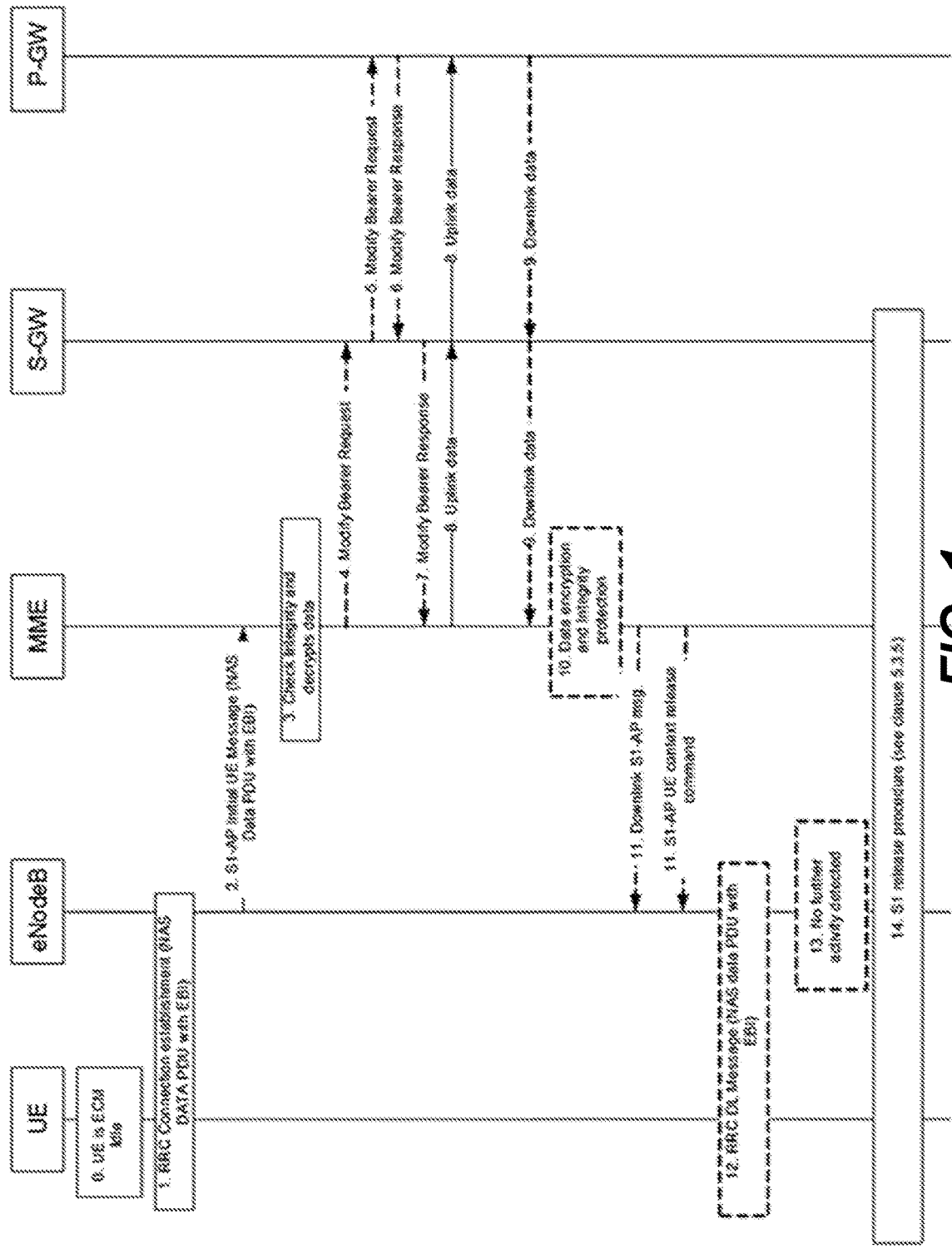
FIG. 1 is a signal flow diagram illustrating an example of establishing an RRC connection according to DoNAS principles.
Figure 2:
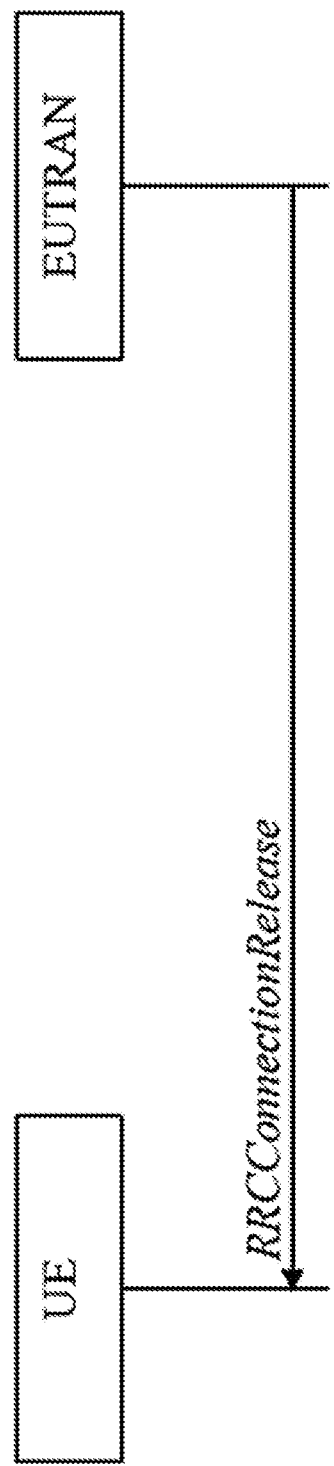
FIG. 2 is a signal flow diagram illustrating an example of releasing an RRC connection.
Figure 3:
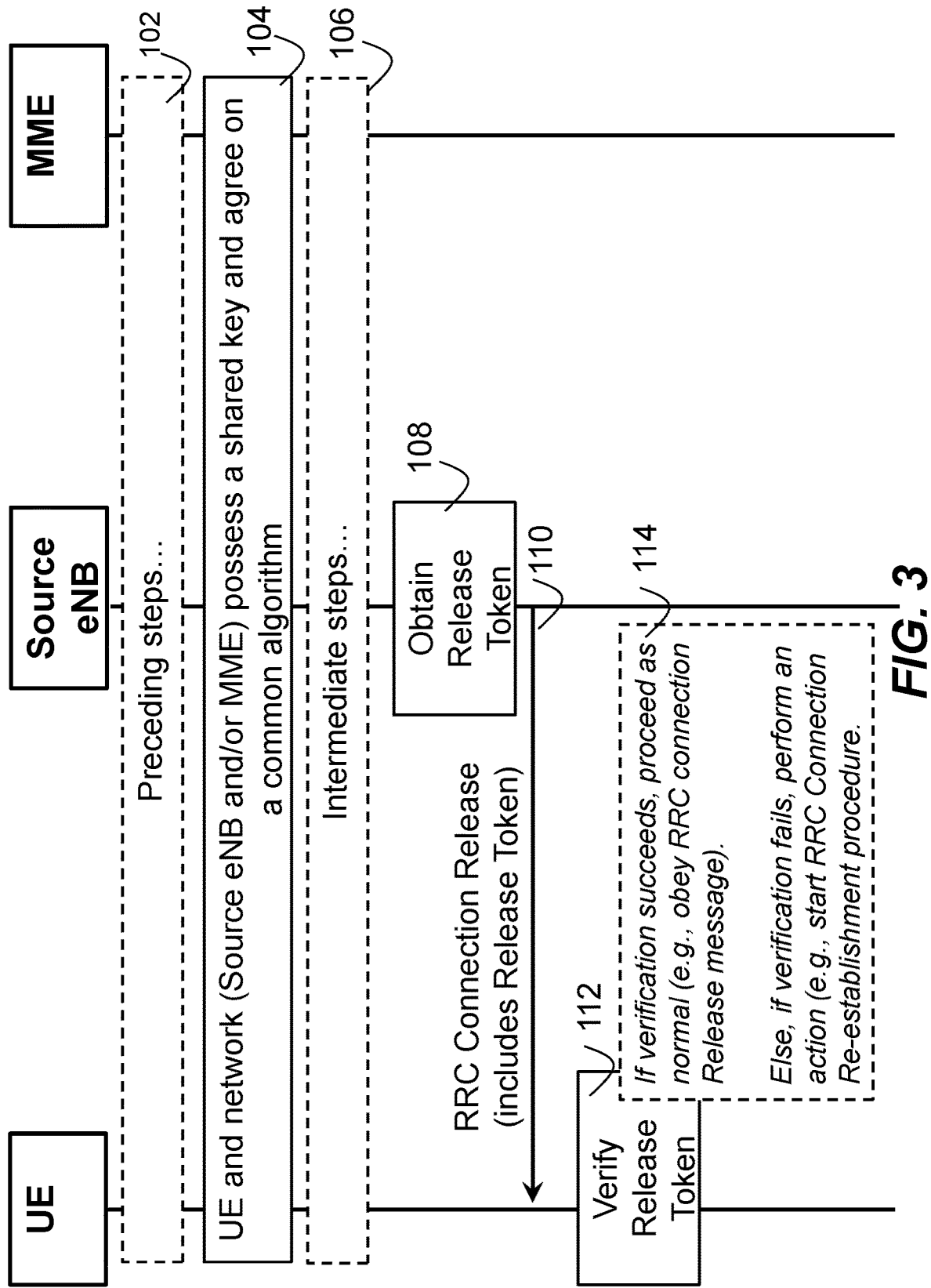
FIG. 3 is a signal flow diagram illustrating an example of using a release token when releasing an RRC connection, in accordance with certain embodiments of the present disclosure.

An embodiment of the proposed solution disclosed herein is illustrated in FIG. 3. The main idea shown in FIG. 3 is that the UE and the eNB use a release token to validate an RRC Connection Release message (the RRC Connection Release may be referred to interchangeably as a message, a command, or an instruction). The release token is sent by the eNB and used by the UE to determine that an RRC Connection Release message is genuine. By ensuring that the RRC Connection Release message is genuine, the effects of spoofed RRC Connection Release messages can be mitigated.

At step 102, the preceding steps of RRC connection establishment and NAS attach procedure are performed between the UE and the network (including source eNB and MME). These steps may be performed according to existing mechanisms in current specification or may use known techniques. The descriptions of those steps are not described for conciseness.

After step 102, the method proceeds to step 104. At step 104, the UE and the network (eNB and or MME) have agreed upon a shared key and a common algorithm. Certain embodiments may be independent of whether the network node/function that the UE has agreement of key and algorithm is the eNB and/or the MME. As mentioned above, there are various known techniques to protect from spoofed RRC Connection Re-establishment message that rely on the UE having shared key/algorithm with the eNB and also with the MME.

At step 106, intermediate steps are performed where the UE sends data using DoNAS. The intermediate steps follow the existing mechanisms in current specification or use known techniques. The descriptions of those steps are not described for conciseness.

When the eNB decides to release the RRC connection with the UE, the eNB obtains a release token at step 108. The release token is obtained based on the shared key and the agreed algorithm from step 104. One way for the eNB to obtain the release token is to get it from the MME (not shown in FIG. 3). The release token can be obtained from the MME in advance/before the release token is needed, or the release token can be requested from the MME at the time when the release token is needed. Another way for the eNB to obtain the release token is to itself calculate the release token. In the former case (the case where the eNB obtains the release token from the MME), it is the UE and the MME who have a shared key/algorithm. In the latter case (the case where the eNB calculates the release token), it is the UE and the eNB who have a shared key/algorithm.

In any case, it is proposed that the release token is calculated using the agreed algorithm with one or more of the followings as the input: shared key, physical cell identity (PCI) of the source cell/eNB, one or more freshness parameters, and/or a constant. Examples of freshness parameters that can be used include the current Cell Radio Network Temporary Identifier (C-RNTI) of the UE or any randomly generated value (commonly called nonce). An advantage of using C-RNTI is that the UE and the eNB both know it and therefore it does not need to be transferred with the RRC-ConnectionRelease message. An example of a constant that can be used is a string "RELEASE-CIoT". The constant allows for differentiating the release token from other potential tokens for different use cases that are calculated using the same shared key and algorithm. In certain embodiments, the input comprises at least a shared key. In some embodiments, a global cell identity, such as a cell global identifier (CGI) or an extended CGI (ECGI), may be used in place of the PCI in the input. If it is the MME that calculates the release token and gives to the eNB, then the MME should know the information that in principle belongs to the source cell/eNB, such as the PCI and C-RNTI, for example, by receiving the information from the source eNB or fetching the information from some database.

At step 110, the eNB includes the computed release token in the RRCConnectionRelease message or similar and the UE receives the RRCConnectionRelease message and the eNB provided release token.

At step 112, the UE verifies the eNB provided release token. For that, the UE compares the received release token with the release token computed by itself. The UE computes the release token using the same mechanism as the eNB/MME (same algorithm and parameters as described above).

At step 114, if the verification succeeds (i.e., the received token matches the release token computed by the UE), the UE executes the RRC connection release procedure. Else if the verification fails, (i.e., the received release token does not match the release token computed by the UE), the UE takes some action. Examples of such actions could be to ignore the connection release message; alternatively, the UE may trigger an RLF and/or RRC Connection Reestablishment procedure or some other recovery or failure handling procedure.

Messages and messages names corresponding to messages and message names referred to above may be different in different technologies. E.g., in NB-IoT, RRCConnectionRelease-NB and RRCConnectionRelease may be used interchangeably.

If an attacker attempts to send RRC Connection Release before the UE and the network have an agreed key/algorithm, the UE has no choice than to obey the message. This case is not very attractive or become more difficult for an attacker because first, the attack time window is short, and second, there is no data transfer that the attacker can hinder. In other words, the incentive for attack becomes less. Further, the attack effect reduces to becoming similar as radio jamming.

In this light, it shall be appreciated that the solution proposed herein prevents losses of ongoing uplink/downlink data (especially ongoing data transfers of prolonged session are protected) against spoofed RRC Connection Release message after the UE and the network have an agreed key/algorithm in place. The UE and the network need to be implicitly or explicitly in sync that the key/algorithm is in place and the next RRC Connection Release must contain a valid release token, e.g., successful NAS security mode command procedure when release token is generated by MME, some downlink bit or downlink token (as discussed in more detail in provisional application U.S. 62/451,866 filed Jan. 30, 2017) from eNB to the UE proving that the eNB is in possession of required key/algorithm. As a non-limiting example, the network can provide UE with explicit indication that key/algorithm is in place by means of, e.g., L2 or L3 signalling; e.g., with an RRC message or indication in an RRC message.

As a non-limiting example implicit indication can comprise reaching an agreed state or point in a signalling flow or sequence or after a certain time (relative to some reference time; e.g., an UL or DL transmission) which can be configurable or specified.

Figure 4:
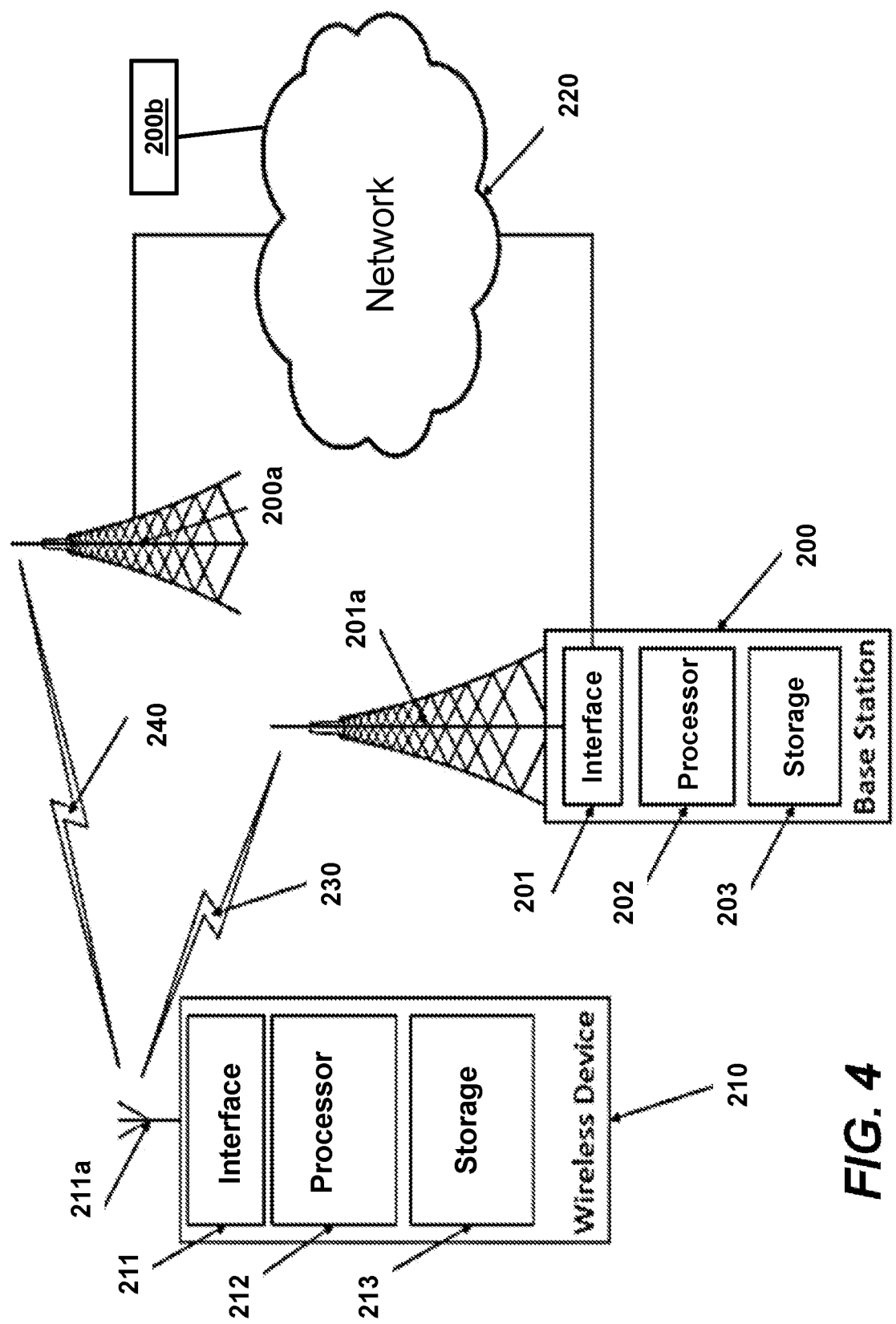
FIG. 4 is a block diagram illustrating an example of a wireless network, in accordance with certain embodiments of the present disclosure.

Although the solutions described above may be implemented in any appropriate type of system using any suitable components, particular embodiments of the described solutions may be implemented in a wireless network such as the example wireless communication network illustrated in FIG. 4. In the example embodiment of FIG. 4, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 4 illustrates a wireless network comprising a more detailed view of network node 200 and wireless device (WD) 210, in accordance with a particular embodiment. For simplicity, FIG. 4 only depicts network 220, network nodes 200 (including radio access network node 200a and core network node 200b), and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above. The term "radio access network node" is used to refer to network nodes in the radio access network, such as eNBs in LTE or gNBs in 5G. The term "core network node" is used to refer to network nodes in the core network, such as MMEs in LTE or AMFs in 5G.

In FIG. 4, Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 4, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Figure 5:
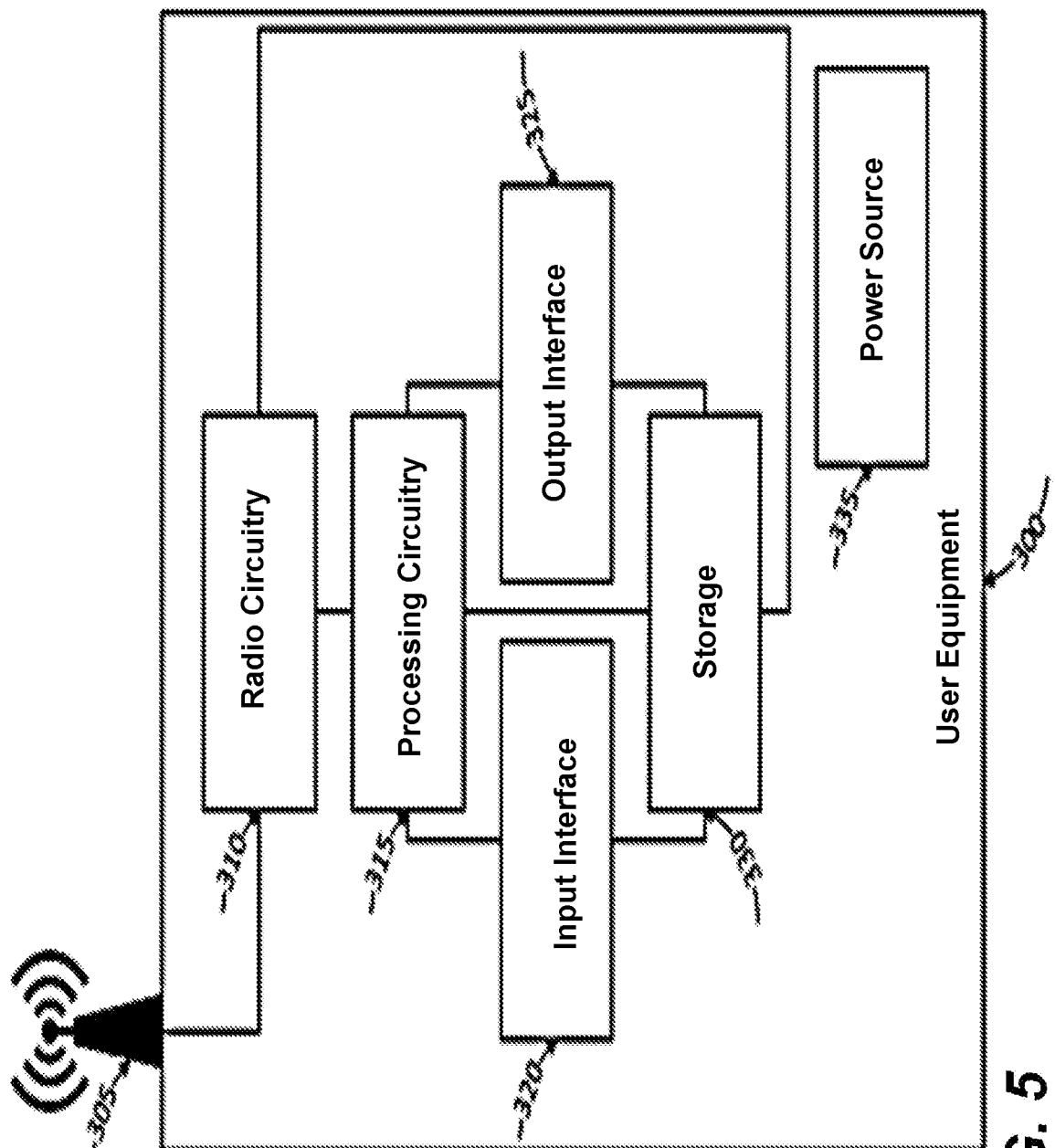
FIG. 5 is a block diagram illustrating an example of a user equipment, in accordance with certain embodiments of the present disclosure.

As shown in FIG. 5, user equipment 300 is an example wireless device. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 5 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, Wi-Fi, or Bluetooth wireless technologies. These wireless technologies may be integrated into the same or different chipsets and other components within wireless device 300.

Figure 6:
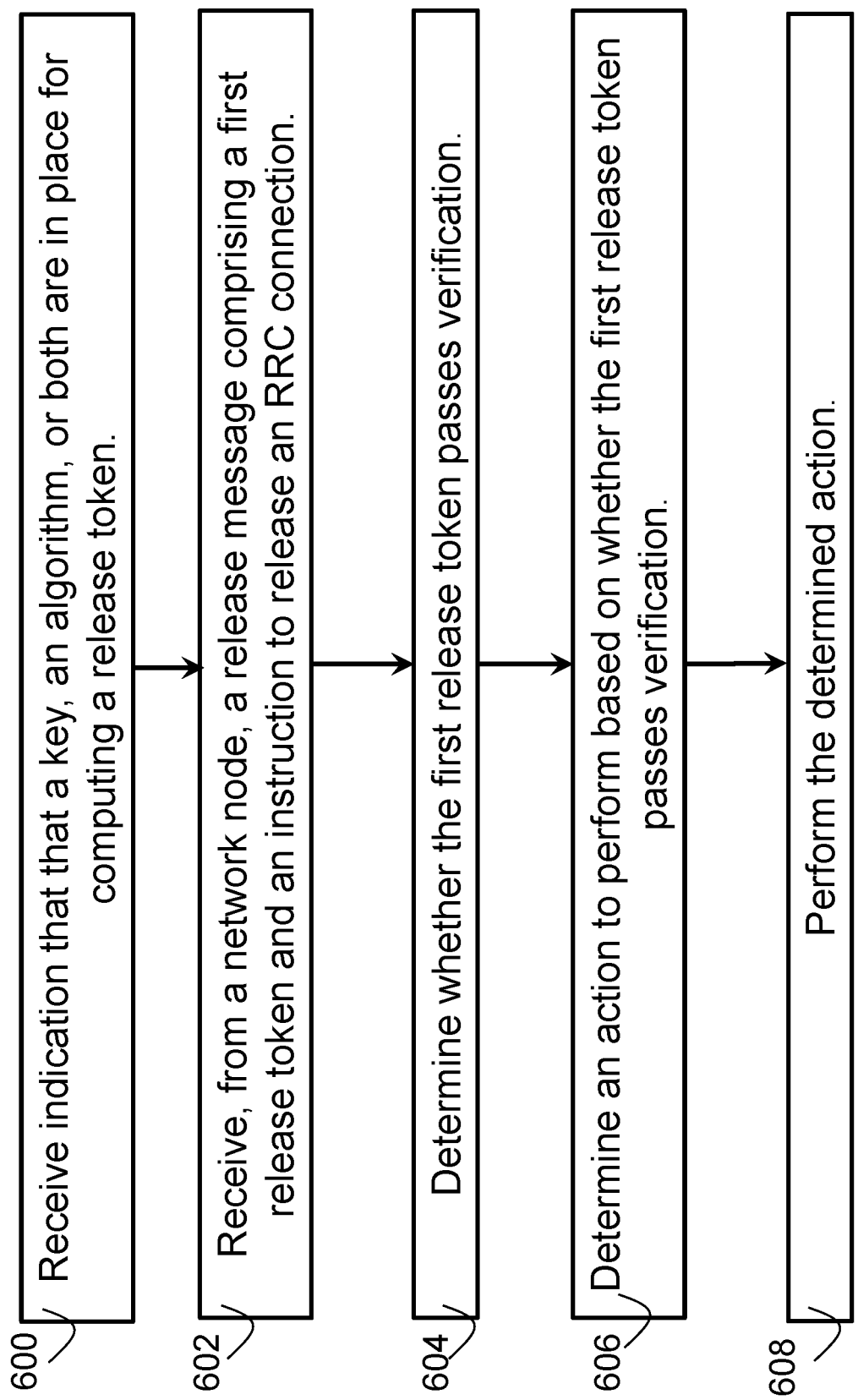
FIG. 6 is a flow chart illustrating an example method for use in a wireless device, in accordance with certain embodiments of the present disclosure.

FIG. 6 illustrates an example of a method that may be performed by a wireless device that has established an RRC connection with a network. Examples of wireless devices that may perform the method of FIG. 6 include WD 210 described above with respect to FIG. 4 and UE 300 described above with respect to FIG. 5.

In some embodiments, such as embodiments where token-based verification can be used in some circumstances and not used in other circumstances, the wireless device obtains information indicating that the wireless device is to use token-based verification of a release message. For example, if the wireless device can connect to different networks, some of which may support this token-based verification and some of which may not, the wireless device may need to know, e.g., whether a token is required to accept a release and/or whether some networks should be deprioritized or even avoided because they do not support secure release or some networks should be prioritized for supporting more secure handling of release. Also, since there may potentially be an initial phase during which a token is not (yet) available, it is useful to be able to indicate a point after which the wireless device should not accept a release message that is missing a valid token. Thus, the indication whether token-based verification is in place is received prior to receiving the release message. The indication may be implicit or explicit. As an example, an implicit indication that token-based verification is in place may be based on reaching a certain point in a signaling flow or based on a timer (e.g. after a certain amount of time, token-based verification is in place). As another example, receiving an indication that a key, an algorithm, or both are in place for computing a release token (as described with respect to step 600 below) may be understood as an indication that token-based verification is in place. If token-based verification is in place, the wireless device may obtain its release token (e.g., in some embodiments, the wireless device obtains a key, algorithm, or both for computing its release token).

At 600, the wireless device obtains an indication that that a key, an algorithm, or both are in place for computing a release token. The indication is obtained prior to receiving a release message that uses the release token (e.g., the release message of step 602 discussed below). The indication can be obtained either explicitly or implicitly. As a non-limiting example, the wireless device can receive the indication from the network explicitly by means of, e.g., L2 or L3 signaling; e.g., with an RRC message or indication in an RRC message. As a non-limiting example, the wireless device can receive the indication from the network implicitly by reaching an agreed state or point in a signaling flow or sequence or after a certain time (relative to some reference time; e.g., an UL or DL transmission) which can be configurable or specified. In embodiments that receive the indication from a network node, the indication can be received from any suitable network node, such as a core network node or a radio access network node.

At step 602, the wireless device receives a release message from a network node. The release message comprises a first release token and an instruction to release an RRC connection. For example, the network node may opt to include a release token if AS security has not been established for the RRC connection, if DRBs have not been established for the RRC connection, or if the RRC connection supports CP-CIoT or DoNAS functionality. In some embodiments, the release message is received via an SRB that lacks access stratum security. The first release token can be received via access stratum signaling (e.g., in the case where the radio access network node provides the first release token to the wireless device) or via non access stratum signaling (e.g., in the case where the core network node provides the first release token to the wireless device). In the case of non access stratum signaling, the core network node may communicate the first release token to the wireless device via the radio access network node without the radio access network node having to interpret the first release token.

At step 604, the wireless device determines whether the first release token passes verification. In certain embodiments, the wireless determines that the first release token passes verification if the first release token received in the release message of step 602 matches a second release token obtained by the wireless device. For example, the wireless device may obtain the second release token by computing the second release token. In some embodiments, the second release token is computed based at least in part on a key shared between the wireless device and the network and/or based at least in part on an algorithm agreed between the wireless device and the network. For example, the wireless device may compute the second release token based on the indication in step 600 indication that a key, an algorithm, or both are in place for computing the release token.

At step 606, the wireless device determines an action to perform based on whether the first release token passed verification in step 604. For example, in response to a determination that the first release token passed verification, the action comprises releasing the RRC connection. By contrast, in response to a determination that the first release token fails verification, the action may comprise starting a procedure to re-establish the RRC connection and/or ignoring the instruction to release the RRC connection.

At step 608, the wireless device performs the action determined in step 606 (e.g., the wireless device obeys or ignores the instruction to release the RRC connection depending on whether the first token received in the release message matches the second token obtained by the wireless device).

Figure 7:
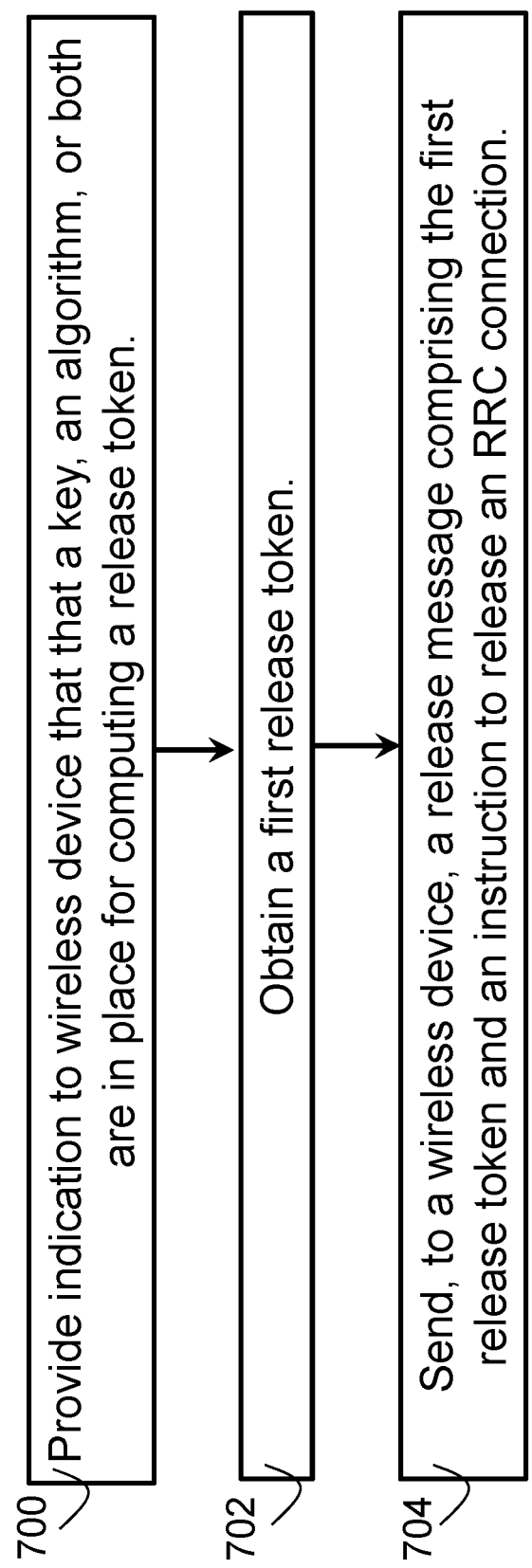
FIG. 7 is a flow chart illustrating an example method for use in a network node, in accordance with certain embodiments of the present disclosure.

FIG. 7 illustrates an example of a method that may be performed by a network node that has established an RRC connection with a wireless device. Examples of network nodes that may perform the method of FIG. 7 include a radio access network node (e.g., using access stratum signaling) or a core network node (e.g., using non access stratum signaling). Radio access network nodes 200a, such as eNBs in LTE or gNBs in 5G, and core network nodes 200b, such as MMEs in LTE or AMF in 5G, are described above with respect to FIG. 4.

In some embodiments, such as embodiments where token-based verification can be used in some circumstances and not used in other circumstances, the network node obtains information that the wireless device is to use token-based verification of a release message. As an example, the network node may determine that token-based verification is in place may be based on reaching a certain point in a signaling flow or based on a timer (e.g. after a certain amount of time, token-based verification is in place). The indication whether token-based verification is in place is obtained prior to sending the release message. In some embodiments, the network node may indicate to the wireless device that token-based verification is in place. The indication can be implicit or explicit. As one example, sending an indication that a key, an algorithm, or both are in place for computing a release token (as described with respect to step 700 below) may be understood as an indication that token-based verification is in place.

At 700, the network node provides the wireless device with an indication that that a key, an algorithm, or both are in place for computing a release token. The indication is provided to the wireless device prior to sending a release message that uses the release token (e.g., the release message of step 702 discussed below). The indication can be provided either explicitly or implicitly. As a non-limiting example, the network node can provide the indication explicitly by means of, e.g., L2 or L3 signaling; e.g., with an RRC message or indication in an RRC message. As a non-limiting example, the network node can provide the indication implicitly by reaching an agreed state or point in a signaling flow or sequence or after a certain time (relative to some reference time; e.g., an UL or DL transmission) which can be configurable or specified.

At step 702, the network node obtains a first release token. The first release token is obtained to match a second release token that the wireless device will obtain/compute based on the indication in step 700. In some embodiments, the network node obtains the first release token by computing the first release token. For example, the first release token can be computed based on a key shared between the wireless device and the network and/or an algorithm agreed between the wireless device and the network, such as the key/algorithm indicated in step 700. In addition, or in the alternative, the first release token can be computed based at least in part on information received from another network node. For example, the key/algorithm may be indicated to the wireless device implicitly or explicitly by a core network node in step 700, and the key/algorithm can be indicated from the core network node to the radio access network node in step 702 so that the wireless device and the radio access network node can compute matching release tokens.

In another embodiment, the network node obtains the first release token (i.e., the first release token itself) from another network node. In certain embodiments, when the network node performing the method is a radio access network node (e.g., a base station), the first release token can be obtained from a core network node (e.g., an MME in LTE or an AMF in 5G). For example, the core network node may compute the first release token based on the key/algorithm indicated in step 700 and may provide the computed first release token to the radio access network node.

In certain embodiments, obtaining the first release token in step 702 may comprise retrieving the first release token from memory of the network node, e.g., in the case that the network node has previously computed the first release token or previously received the first release token from another network node.

At step 704, the network node sends a release message to the wireless device. In certain embodiments, the release message is sent in response to detecting a radio link failure associated with the RRC connection. The release message comprises the first release token and an instruction to release the RRC connection. For example, the network node may determine to include a release token if AS security has not been established for the RRC connection, if DRBs have not been established for the RRC connection, or if the RRC connection supports CP-CIoT or DoNAS functionality. In some embodiments, the release message is sent via an SRB that lacks access stratum security. Additionally, in certain embodiments, the network node determines to include the first release token in the release message because the release message is being sent via an SRB that lacks access stratum security (in other words, for cases in which access stratum security is established, the network node may determine not to use release tokens).

The first release token can be sent via access stratum signaling (e.g., in the case where the radio access network node performs the method) or via non access stratum signaling (e.g., in the case where the core network node performs the method). In the case of non access stratum signaling, the core network node may communicate the first release token to the wireless device via the radio access network node without the radio access network node having to interpret the first release token.

Sending the first release token in step 704 indicates to the wireless device that the release message is genuine so that the wireless device can proceed with releasing the RRC connection.

Figure 8:
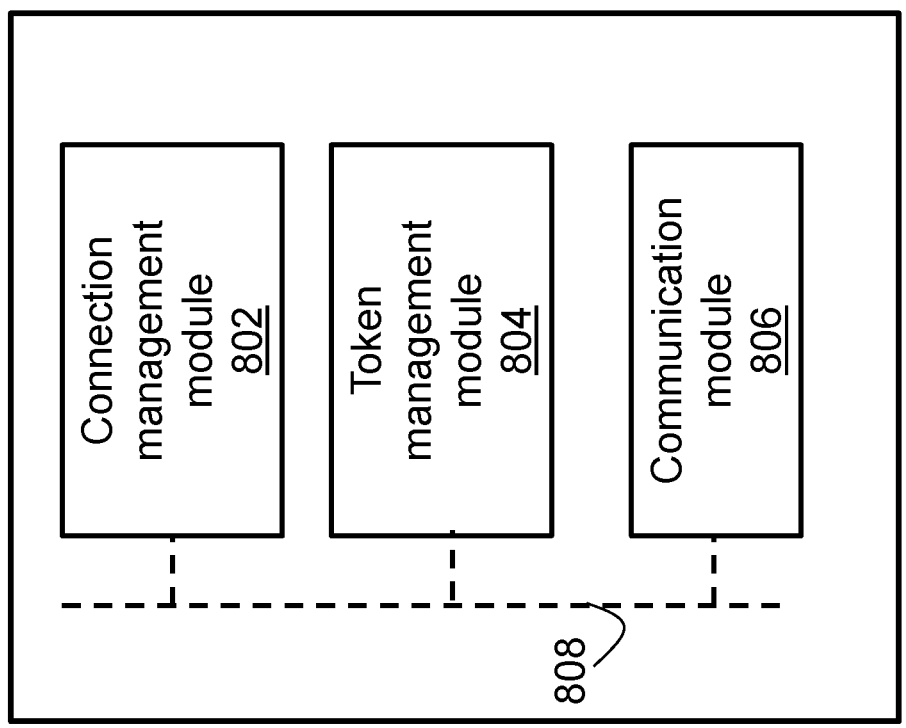
FIG. 8 illustrates examples of modules that may be included in a network node or a wireless device, in accordance with certain embodiments of the present disclosure.

FIG. 8 illustrates an example of one or more modules that may be included in a network node (such as radio access node 200a or core network node 200b) or a wireless device (such as WD 210 or UE 300), according to certain embodiments. In certain embodiments, one or more of the modules may be implemented in processing circuitry, such as circuitry of processor 202 of network node 200, circuitry of processor 212 of WD 210, or processing circuitry 315 of UE 300. For example, processing circuitry may be configured to execute logic encoded in a computer program stored in a non-transitory computer readable medium (such as storage 203 of network node 200, storage 213 of WD 210, or storage 330 of UE 300). The modules depicted in FIG. 8 include a connection management module 802, a token management module 804, and a communication module 806. The modules may be integrated or separated in any suitable manner, and certain embodiments may provide the described functionality using more, fewer, or different modules.

With respect to embodiments that implement modules 802, 804, and/or 806 in a network node, connection management module 802 may be configured to establish and release RRC connections between the network node and wireless devices. Token management module 804 may be configured to manage release tokens that facilitate releasing RRC connections. In certain embodiments, token management module 804 may obtain/compute a first release token, e.g., as described with respect to step 702 of FIG. 7. In certain embodiments, token management module 804 may determine information (e.g., key/algorithm) to provide to the wireless device so that the wireless device can obtain/compute a second release token that matches the first release token. Communication module 806 may send messages to and receive messages from wireless devices. Connection management module 802, token management 804, and communication module 806 may communicate with each other via an interface 808. For example, in some embodiments, connection management module 802 may instruct communication module 806 to communicate messages related to establishing the RRC connection to the wireless device. After the RRC connection is established, communication module 806 may receive the key/algorithm for obtaining/computing the second release token from token management module 804 and may send the wireless device an explicit indication of the key/algorithm, e.g., as described with respect to step 700 of FIG. 7. Connection management module 802 may subsequently determine to release the RRC connection, for example, based on detecting a radio link failure. Connection module 802 may instruct communication module 806 to send a release message to the wireless device. Connection module 802 may obtain the first release token from token management module 804 and may send the release message comprising the first release token to the wireless device, e.g., as described with respect to step 704 of FIG. 7.

With respect to embodiments that implement modules 802, 804, and/or 806 in a wireless device, connection management module 802 may be configured to establish and release RRC connections between the network node and wireless devices. Token management module 804 may be configured to obtain/compute and verify release tokens that facilitate releasing RRC connections. Communication module 806 may send messages to and receive messages from network nodes. Connection management module 802, token management 804, and communication module 806 may communicate with each other via an interface 808.

For example, in some embodiments, connection management module 802 may instruct communication module 806 to communicate messages related to establishing the RRC connection to the network node. After the RRC connection is established, communication module 806 may receive an indication from a network node indicating a key/algorithm for obtaining/computing a second release token, e.g., as described with respect to step 600 of FIG. 6. Communication module 806 may provide the key/algorithm to token management module 804 so that token management module 804 can compute the second release token. Communication module 806 may subsequently receive a release message from the network node that comprises a first release token, e.g., as described with respect to step 602 of FIG. 6. Communication module 806 may provide the received first release token to token management module 804. Token management module 804 may determine whether the received first release token passes verification, e.g., as described with respect to step 604 of FIG. 6. For example, token management module may check whether the received first release token matches the computed second release token. Token management module 804 indicates to connection management module 802 whether the first release token passes verification. Connection management module 802 can then determine an action to perform, e.g., as described with respect to step 606 of FIG. 6. For example, if the first release token passes verification, connection management module 802 may determine to release the connection and may release the connection, e.g., as described with respect to step 608 of FIG. 6. In certain embodiments, connection management module 802 may instruct communication module 806 to communicate messages related to releasing the connection to the network node.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for use in a wireless device, the method comprising:
    receiving a release message from a network node operating in a network, wherein the release message comprises a first release token and an instruction to release a radio resource control (RRC) connection;
    determining whether the first release token passes verification; and
    determining an action to perform based on whether the first release token passes verification;
    wherein, in response to a determination that the first release token passes verification, the action comprises releasing the RRC connection;
    wherein the RRC connection supports Control Plane Cellular Internet-of-Things (CP-CIoT) or Data over Non Access Stratum (DoNAS) functionality.

2. The method of claim 1, wherein the RRC connection comprises a connection for which access stratum (AS) security has not been established.

3. The method of claim 1, wherein the RRC connection comprises a connection for which data radio bearers (DRBs) have not been established.

4. The method of claim 1, wherein the first release token is received via one of:
    access stratum (AS) signalling; or
    non access stratum (NAS) signaling.

5. The method of claim 1, wherein in response to a determination that the first release token fails verification, the action comprises starting a procedure to re-establish the RRC connection.

6. The method of claim 1, wherein determining whether the first release token passes verification comprises:
    determining that the first release token passes verification if the first release token received in the release message matches a second release token obtained by the wireless device.

7. The method of claim 6, further comprising computing the second release token based at least in part on at least one of:
    a key shared between the wireless device and the network; or
    an algorithm agreed between the wireless device and the network.

8. The method of claim 1, further comprising, prior to receiving the release message, obtaining an indication indicating that a key, an algorithm, or both are in place for computing the second release token.

9. The method of claim 1, wherein the indication indicating that the key, the algorithm, or both are in place for computing the second release token is received from a radio access network node.

10. A wireless device comprising processing circuitry and logic that, when executed by the processing circuitry, causes the wireless device to:
    receive a release message from a network node operating in a network, wherein the release message comprises a first release token and an instruction to release a radio resource control (RRC) connection;
    determine whether the first release token passes verification; and
    determine an action to perform based on whether the first release token passes verification;
    wherein, in response to a determination that the first release token passes verification, the action comprises releasing the RRC connection;
    wherein the RRC connection supports Control Plane Cellular Internet-of-Things (CP-CIoT) or Data over Non Access Stratum (DoNAS) functionality.

11. The wireless device of claim 10, wherein the RRC connection comprises a connection for which access stratum (AS) security has not been established.

12. The wireless device of claim 10, wherein the RRC connection comprises a connection for which data radio bearers (DRBs) have not been established.

13. The wireless device of claim 10, wherein the first release token is received via one of:
    access stratum (AS) signalling; or
    non access stratum (NAS) signaling.

14. The wireless device of claim 10, wherein in response to a determination that the first release token fails verification, the action comprises starting a procedure to re-establish the RRC connection.

15. The wireless device of claim 10, wherein to determine whether the first release token passes verification, the wireless device is configured to:
    determine that the first release token passes verification if the first release token received in the release message matches a second release token obtained by the wireless device.

16. The wireless device of claim 15, wherein the wireless device is configured to compute the second release token based at least in part on at least one of:
    a key shared between the wireless device and the network, or
    an algorithm agreed between the wireless device and the network.

17. The wireless device of claim 10, wherein prior to receiving the release message, the wireless device is further configured to receive an indication from a core network node associated with the network, the indication indicating that a key, an algorithm, or both are in place for computing the second release token.

18. A method for use in a network node operating in a network, the method comprising:
    obtaining a first release token;
    sending information indicating that a wireless device is to use token-based verification of a release message;
    determining whether to include the first release token in the release message based on whether the release message is being sent via a signaling radio bearer (SRB) that lacks access stratum security; and sending a release message to a wireless device, wherein the release message comprises the first release token and an instruction to release a radio resource control (RRC) connection wherein the RRC connection supports Control Plane Cellular Internet-of-Things (CP-CIoT) or Data over Non Access Stratum (DoNAS) functionality and wherein the release message is sent in response to detecting a radio link failure (RLF) associated with the RRC connection.

\* \* \* \* \*